United States Patent [19]

Kambara

[11] 4,247,648
[45] Jan. 27, 1981

[54] METHYLQUINOLINE ANION EXCHANGE RESIN BASED ON HALOALKYL VINYL AROMATIC POLYMERS

[75] Inventor: Hiroshi Kambara, Abiko, Japan

[73] Assignee: Rohm and Haas Company, Philadelphia, Pa.

[21] Appl. No.: 47,181

[22] Filed: Jun. 8, 1979

[51] Int. Cl.$^3$ ............... B01J 41/04; C08F 226/06; C08F 8/30
[52] U.S. Cl. .................... 521/32; 526/259; 525/375; 525/332
[58] Field of Search .................. 521/32; 525/375; 526/259

[56] References Cited

U.S. PATENT DOCUMENTS

| | | | |
|---|---|---|---|
| 2,824,844 | 2/1958 | Gilwood | 521/32 |
| 3,022,253 | 2/1962 | McMaster | 521/32 |
| 4,011,204 | 3/1977 | Benes et al. | 526/259 |

Primary Examiner—Joseph L. Schofer
Assistant Examiner—Peter F. Kulkosky

[57] ABSTRACT

Crosslinked basic polymers useful as anion exchange resins are prepared by reacting a crosslinked vinyl aromatic polymer containing haloalkyl groups with a methylquinoline compound in an alkaline medium.

7 Claims, No Drawings

METHYLQUINOLINE ANION EXCHANGE RESIN BASED ON HALOALKYL VINYL AROMATIC POLYMERS

This invention relates to crosslinked basic polymers useful for industrial applications such as ion exchange, and to a method for the manufacture thereof. More specifically, this invention relates to crosslinked basic polymers based on a crosslinked vinyl aromatic polymer matrix containing haloalkyl groups. The haloalkyl groups are reacted with a methylquinoline compound in a basic solvent to produce the basic polymers.

The crosslinked vinyl aromatic polymers which contain haloalkyl groups and which are used to produce the basic polymers of the invention comprise haloalkyl group-containing copolymers of aromatic monovinyl hydrocarbons and aromatic divinyl hydrocarbons (crosslinkers), wherein the haloalkyl groups are incorporated by halogenating the crosslinked copolymers with chlorine or a mixture of an aldehyde and a halogen acid (as described in U.S. Pat. Nos. 2,632,001 and 2,591,573), by halomethylating the crosslinked copolymers as with chloromethyl methyl ether (U.S. Pat. No. 2,614,099), or by including with or in place of the aromatic monovinyl hydrocarbons a haloalkyl monovinyl monomer such as vinylbenzyl chloride (U.S. Pat. Nos. 3,843,566, 3,991,017). All of these classes of crosslinked haloalkyl group containing aromatic polymer matrices are well known. As is evident from the last cited patents and Canadian Pat. No. 932,126 the crosslinked polymer matrix may be in the form of a gel or macroreticular beads or a porous mass depending on the polymerization method. For example, solution, emulsion or bulk polymerization will normally provide a porous mass or droplets which can be suitably dried and ground up to provide a particulate material. Preferably, suspension polymerization is employed, resulting in spherical particles or beads. The latter is the preferred form for many industrial applications such as catalysis and columnar separations. Accordingly, the selection of crosslinked haloalkyl group containing starting polymers and preparation thereof is not critical and can be varied within wide limits as known to those skilled in the art.

Representative of specific crosslinked polymer matrices usable as starting materials in the invention are those obtained by copolymerizing styrene with crosslinking monomers such as aromatic polyvinyl monomers like divinyl benzene, divinyl toluene and divinyl naphthalene, or aliphatic polyvinyl monomers like diacrylic ethylene glycol esters, dimethacrylic ethylene glycol esters and divinyl adipate, and then chloromethylating the copolymers with chloromethyl methyl ether or with a mixture of hydrochloric acid, methanol and formalin.

The amount of the crosslinking monomer relative to the total amount of the monomer mixture can be freely varied, i.e., from about 0.1 to about 80% by weight of the monovinyl monomers. However, since the total potential capacity of the polymer products when used as anion exchange resins decreases with an increase in the amount of crosslinking agent, an amount of about 0.5 to about 30%, preferably about 2-15%, is recommended when ion exchange use is contemplated.

The crosslinked polymer matrix is then reacted with a methylquinoline compound in a basic solvent medium. Examples of methylquinolines which are usable for the present invention include substituted and unsubstituted methylquinoline compounds such as compounds of the formula

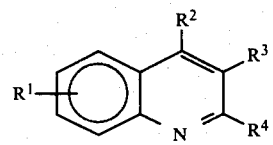

wherein $R^1$ is hydrogen or methyl and $R^2$, $R^3$ and $R^4$ independently are hydrogen, lower alkyl ($C_1$–$C_8$, preferably $C_1$–$C_4$), halogen, hydroxyl or any other non-interfering group, and where at least one of $R^1$, $R^2$, $R^3$ and $R^4$ is methyl. The preferred methylquinoline compounds are the various isomers of methylquinoline, e.g., 2-methylquinoline, 4-methylquinoline, 6-methylquinoline, 7-methylquinoline, and 8-methylquinoline.

Suitable basic solvents include mildly alkaline solvents such as pyridine, quinoline, isoquinoline, and triethylamine. The reaction preferably is carried out at atmospheric pressure and at an elevated temperature, for example, at about 150° C. to about 190° C., although higher or lower temperatures may be employed with suitable adjustment of reaction time and pressure.

Preferred product polymers of the invention are crosslinked, infusible basic polymers predominating in repeating units of the formula (I):

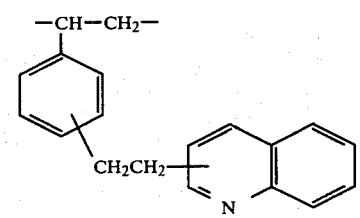

and crosslinked basic polymers of the formula (II):

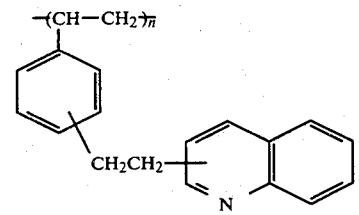

where n is the number of repeating units.

While it is possible that the product basic polymers may contain some quaternary groups by reaction with a basic solvent such as quinoline or triethylamine, it is believed that most of such quaternary groups decompose at the elevated temperature preferred in the process of the invention to provide polymers of structure (II) above. A typical reaction scheme is thus envisioned as follows, where P represents a crosslinked polymer matrix and 2-me. quinoline is 2-methylquinoline. As shown, the final reaction product may contain a minor proportion of quaternary groups.

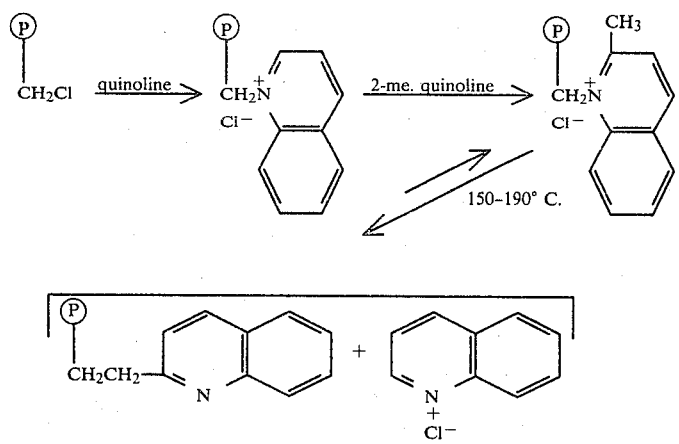

The polymers of the present invention are useful as adsorbents and ion exchange resins in a wide variety of industrial applications, generally wherever adsorbents and ion exchange resins of intermediate basicity are effective, e.g., for purifications, separations, recovery of valuable ionic constituents, replacements of deleterious ions with innocuous ions, fractionations, deionization, and the like. The polymers have specific utility in biochemical and pharmaceutical fields, for example, as acid scavengers and in the separation of compounds having amino and carboxyl functionality, such as amino acids.

The invention will be more particularly described with reference to the following examples.

EXAMPLE 1

A four-necked flask provided with a reflux condenser and stirrer and having an inner volume of 2 liters was charged with 165 g. of chloromethylated macroreticular polystyrene cross-linked with divinylbenzene (degree of crosslinking, 7%), 258 g. of quinoline and 460 g. of 2-methylquinoline. The contents were stirred at a temperature of from 150° to 190° C. for about ten hours. The reaction product was then separated by filtration and washed with methanol and water to afford a reddish brown granular product. The infrared spectrum of the product indicated that the methylquinoline had been incorporated into the crosslinked polymer matrix.

EXAMPLE 2

A four-necked flask provided with a reflux condenser and stirrer and having an inner volume of 2 liters was charged with 106 g. of a gel-type polyvinylbenzyl chloride crosslinked with divinyl benzene (degree of crosslinking, 7%), 258 g. of quinoline and 400 g. of 2-methylquinoline. The contents were stirred at a temperature of from 170° to 190° C. for about ten hours. Subsequently, the reaction product was separated by filtration and washed with methanol and water, to afford a granular product. The infrared spectrum of the product showed the presence of methylquinoline.

EXAMPLE 3

The granular products obtained in Example 1 and Example 2 were tested for water content and anion exchange capacity. The results, shown in the following table, indicate both strong and weak base capabilities.

| Product | Water Content (%) | Weakly Basic Exchange Capacity (meq./g., dry) | Strongly basic exchange capacity (meq./g., dry) |
| --- | --- | --- | --- |
| Example 1 | 33.3 | 2.8 | 1.4 |
| Example 2 | 19.0 | 1.1 | 0.1 |

I claim:

1. A crosslinked basic polymer predominating in repeating units of the formula:

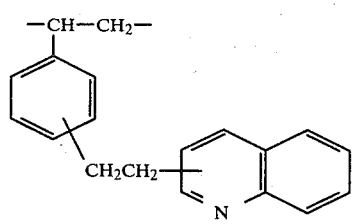

2. A basic polymer prepared by reacting, in a basic solvent, a crosslinked monovinyl aromatic polymer matrix containing haloalkyl groups, and a methyl quinoline compound of the formula

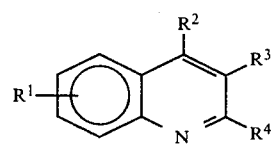

where $R^1$ is hydrogen or methyl and $R^2$, $R^3$ and $R^4$ independently are hydrogen, lower alkyl, halogen or hydroxyl, and where at least one of $R^1$, $R^2$, $R^3$ and $R^4$ is methyl.

3. The basic polymer of claim 2 wherein the crosslinked haloalkyl group-containing polymer matrix comprises a chloromethylated polymer, and the methylquinoline compound is methylquinoline.

4. An anion exchange resin comprising the crosslinked basic polymer of claims 1, 2 or 3 in granulated or bead form.

5. A method of preparing a basic polymer, which comprises reacting, in a basic solvent, a crosslinked polymer matrix predominating in repeating units of the formula:

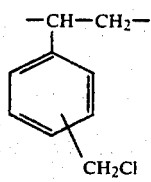

with a methylquinoline compound.

6. A method of preparing a basic polymer, which comprises reacting, in a basic solvent, a crosslinked monovinyl aromatic polymer matrix containing haloalkyl groups with a methylquinoline compound of the formula

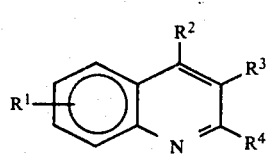

where $R^1$ is hydrogen or methyl and $R^2$, $R^3$ and $R^4$ independently are hydrogen, lower alkyl, halogen or hydroxyl, and where at least one of $R^1$, $R^2$, $R^3$ and $R^4$ is methyl.

7. The method of claim 6 wherein the crosslinked haloalkyl group-containing polymer matrix is a chloromethylated polymer, and the methylquinoline compound is methylquinoline.

* * * * *